US007767019B2

(12) United States Patent
Liu et al.

(10) Patent No.: US 7,767,019 B2
(45) Date of Patent: *Aug. 3, 2010

(54) GYPSUM PRODUCTS UTILIZING A TWO-REPEATING UNIT DISPERSANT AND A METHOD FOR MAKING THEM

(75) Inventors: Qingxia Liu, Vernon Hills, IL (US); Michael P. Shake, Johnsburg, IL (US); David R. Blackburn, Barrington, IL (US); John W. Wilson, Fairview, OK (US); Brian Randall, Fairview, OK (US); Dennis M. Lettkeman, Watonga, OK (US)

(73) Assignee: United States Gypsum Company, Chicago, IL (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/449,924

(22) Filed: Jun. 9, 2006

(65) Prior Publication Data

US 2006/0278130 A1 Dec. 14, 2006

Related U.S. Application Data

(63) Continuation-in-part of application No. 11/152,418, filed on Jun. 14, 2005, now abandoned.

(51) Int. Cl.
*C04B 11/00* (2006.01)
*C04B 24/04* (2006.01)

(52) U.S. Cl. .................... 106/778; 106/772; 106/823; 524/4; 524/5

(58) Field of Classification Search .............. 106/772, 106/778, 823; 524/4, 5
See application file for complete search history.

(56) References Cited

U.S. PATENT DOCUMENTS

| | | |
|---|---|---|
| 4,028,125 A | 6/1977 | Martin |
| 4,202,857 A | 5/1980 | Lowe |
| 4,238,239 A | 12/1980 | Brown |
| 4,327,146 A | 4/1982 | White |
| 4,341,560 A | 7/1982 | Saito et al. |
| 4,561,986 A | 12/1985 | Villa et al. |
| 4,666,971 A | 5/1987 | Greenhalgh |
| 4,814,014 A | 3/1989 | Arfaei |
| 4,927,463 A | 5/1990 | Kloetzer et al. |
| 4,960,465 A | 10/1990 | Arfaei |
| 5,109,030 A | 4/1992 | Chao et al. |
| 5,118,751 A | 6/1992 | Schulze et al. |
| 5,223,036 A | 6/1993 | Koyata et al. |
| 5,362,323 A | 11/1994 | Koyata et al. |
| 5,369,198 A | 11/1994 | Albrecht et al. |
| 5,387,626 A | 2/1995 | Bohme-Kovac et al. |
| 5,393,343 A | 2/1995 | Darwin et al. |
| 5,401,798 A | 3/1995 | Rasp et al. |
| 5,424,099 A | 6/1995 | Stewart et al. |
| 5,556,460 A | 9/1996 | Berke et al. |
| 5,614,017 A | 3/1997 | Shawl |
| 5,643,978 A | 7/1997 | Darwin et al. |
| 5,661,206 A | 8/1997 | Tanaka et al. |
| 5,670,578 A | 9/1997 | Shawl |
| 5,685,903 A | 11/1997 | Stav et al. |
| 5,703,174 A | 12/1997 | Arfaei et al. |
| 5,725,656 A | 3/1998 | Shimanovich et al. |
| 5,725,657 A | 3/1998 | Darwin et al. |
| 5,739,212 A | 4/1998 | Wutz et al. |
| 5,779,786 A | 7/1998 | Patel |
| 5,798,425 A | 8/1998 | Albrecht et al. |
| 5,834,576 A | 11/1998 | Nagano et al. |
| 5,858,083 A | 1/1999 | Stav et al. |
| 5,925,184 A | 7/1999 | Hirata et al. |
| 5,985,989 A | 11/1999 | Shawl et al. |
| 6,034,208 A | 3/2000 | McDaniel et al. |
| 6,043,329 A | 3/2000 | Lepori et al. |
| 6,150,437 A | 11/2000 | Wutz et al. |
| 6,166,112 A | 12/2000 | Hirata et al. |
| 6,187,887 B1 | 2/2001 | Albrecht et al. |
| 6,211,317 B1 | 4/2001 | Albrecht et al. |
| 6,264,739 B1 | 7/2001 | Yamato et al. |
| 6,281,307 B1 | 8/2001 | Muhlebach et al. |
| 6,294,015 B1 | 9/2001 | Yamashita et al. |
| 6,376,581 B1 | 4/2002 | Tanaka et al. |
| 6,437,027 B1 * | 8/2002 | Isomura et al. .............. 524/5 |
| 6,527,850 B2 | 3/2003 | Schwartz et al. |
| 6,620,879 B1 | 9/2003 | Albrecht et al. |
| 6,800,129 B2 | 10/2004 | Jardine et al. |
| 6,852,159 B2 | 2/2005 | Kinoshita et al. |
| 6,869,988 B2 | 3/2005 | Schwartz et al. |

(Continued)

FOREIGN PATENT DOCUMENTS

EP 0537870 A 4/1993

(Continued)

*Primary Examiner*—Paul Marcantoni
(74) *Attorney, Agent, or Firm*—Greer, Burns & Crain, Ltd.; David F. Janci, Esq.; Pradip Sahu, Esq.

(57) ABSTRACT

A gypsum slurry includes water, a hydraulic component including stucco and a polycarboxylate dispersant. The dispersant has two repeating units wherein the first repeating unit is an olefinic unsaturated mono-carboxylic acid repeating unit or an ester or salt, and the second repeating unit is a vinyl or allyl group bound to a polyether by an ether linkage. The slurry can be made into a gypsum panel.

15 Claims, No Drawings

U.S. PATENT DOCUMENTS

| | | |
|---|---|---|
| 6,942,727 B2 * | 9/2005 | Daczko et al. |
| 7,056,964 B2 * | 6/2006 | Lettkeman et al. |
| 7,070,648 B1 | 7/2006 | Schwartz et al. |
| 2003/0019401 A1 | 1/2003 | Schwartz et al. |
| 2003/0127026 A1 | 7/2003 | Anderson et al. |
| 2003/0167973 A1 | 9/2003 | Peev et al. |
| 2004/0045481 A1 | 3/2004 | Sethuraman et al. |
| 2004/0072939 A1 | 4/2004 | Cornman et al. |
| 2004/0149172 A1 | 8/2004 | Jardine et al. |
| 2004/0149174 A1 | 8/2004 | Farrington et al. |
| 2004/0170873 A1 | 9/2004 | Smith |
| 2004/0198873 A1 | 10/2004 | Bury et al. |
| 2004/0211342 A1 * | 10/2004 | Sprouts et al. |
| 2005/0239924 A1 * | 10/2005 | Lettkeman et al. |
| 2006/0100355 A1 * | 5/2006 | Waser et al. |

FOREIGN PATENT DOCUMENTS

| | | |
|---|---|---|
| EP | 0644165 | 3/1995 |
| EP | 0725044 | 8/1996 |
| JP | 56045857 | 4/1981 |
| JP | 59025876 | 2/1984 |
| JP | 61040861 | 2/1986 |
| WO | WO 9533698 | 12/1995 |
| WO | WO 0181263 | 11/2001 |
| WO | WO 03/082765 | 10/2003 |
| WO | WO 03/082766 | 10/2003 |

* cited by examiner

GYPSUM PRODUCTS UTILIZING A TWO-REPEATING UNIT DISPERSANT AND A METHOD FOR MAKING THEM

CROSS REFERENCES TO RELATED APPLICATIONS

This application is a continuation-in-part of U.S. Ser. No. 11/152,418 entitled "Gypsum Products Utilizing a Two-Repeating Unit Dispersant and a Method of Making Them", filed Jun. 14, 2005 now abandoned and herein incorporated by reference.

This application is related to co-pending U.S. Ser. No. 11/152,317, entitled "Modifiers for Gypsum Products and Method of Using Them"; U.S. Ser. No. 11/152,323, entitled "Method of Making a Gypsum Slurry with Modifiers and Dispersants" and U.S. Ser. No. 11/152,404, entitled, "Effective Use of Dispersants in Wallboard Containing Foam", all filed Jun. 14, 2005 and all hereby incorporated by reference.

This application is further related to U.S. Ser. No. 11/450,068 entitled "Modifiers for Gypsum Products and Method of Using Them"; U.S. Ser. No. 11/450,086, entitled "Method of Making a Gypsum Slurry with Modifiers and Dispersants" and U.S. Ser. No. 11/450,122, entitled, "Effective Use of Dispersants in Wallboard Containing Foam", all filed concurrently herewith and all hereby incorporated by reference.

BACKGROUND OF THE INVENTION

This invention relates to fast-drying gypsum products. More specifically, it relates to a gypsum slurry and a wallboard that require less drying time or less energy than conventional products.

Gypsum-based building products are commonly used in construction. Wallboard made of gypsum is fire retardant and can be used in the construction of walls of almost any shape. It is used primarily as an interior wall and ceiling product. Gypsum has sound-deadening properties. It is relatively easily patched or replaced if it becomes damaged. There are a variety of decorative finishes that can be applied to the wallboard, including paint and wallpaper. Even with all of these advantages, it is still a relatively inexpensive building material.

One reason for the low cost of wallboard panels is that they are manufactured by a process that is fast and efficient. A slurry, including calcium sulfate hemihydrate and water, is used to form the core, and is continuously deposited on a paper cover sheet moving beneath a mixer. A second paper cover sheet is applied thereover and the resultant assembly is formed into the shape of a panel. Calcium sulfate hemihydrate reacts with a sufficient amount of the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture. Since each of these steps takes only minutes, small changes in any of the process steps can lead to gross inefficiencies in the manufacturing process.

The amount of water added to form the slurry is in excess of that needed to complete the hydration reaction. Some of the water that is added to the gypsum slurry is used to hydrate the calcined gypsum, also known as calcium sulfate hemihydrate, to form an interlocking matrix of calcium sulfate dihydrate crystals. Excess water gives the slurry sufficient fluidity to flow out of the mixer and onto the facing material to be shaped to an appropriate width and thickness. While the product is wet, it is very heavy to move and relatively fragile. The excess water is removed from the board by evaporation. If the excess water were allowed to evaporate at room temperature, it would take a great deal of space to stack and store wallboard while it was allowed to air dry or to have a conveyor long enough to provide adequate drying time. Until the board is set and relatively dry, it is somewhat fragile, so it must be protected from being crushed or damaged.

To dry the boards in a relatively short period of time, the wallboard product is usually dried by evaporating the extra water at elevated temperatures, for example, in an oven or kiln. It is relatively expensive to build and operate the kiln at elevated temperatures, particularly when the cost of fossil fuels rises. A reduction in production costs could be realized by reducing the amount of excess water present in set gypsum boards that is later removed by evaporation.

Another reason to decrease water is that the strength of gypsum products is inversely proportional to the amount of water used in its manufacture, especially in full density slurries. As the excess water evaporates, it leaves voids in the matrix once occupied by the water. Where large amounts of water were used to fluidize the gypsum slurry, more and larger voids remain in the product when it is completely dry. These voids decrease the product density and strength in the finished product.

Dispersants are known for use with gypsum that help fluidize the mixture of water and calcium sulfate hemihydrate so that less water is needed to make a flowable slurry. Naphthalene sulfonate dispersants are well known, but have limited efficacy. Polycarboxylate dispersants are commonly used with cements and, to a lesser degree, with gypsum. The class of compounds represented by the term "polycarboxylate dispersants" is huge, and it is very difficult to predict how individual compounds react in different media.

Despite the large amount of prior art to polycarboxylate dispersants, it is difficult to predict the effect of any particular compound on the products with which it is used. Polycarboxylates are generally known to improve fluidity in cement. This does not necessarily mean that every polycarboxylate will produce the same result in gypsum products. Gypsum and cement form different crystal patterns that may disperse differently in a polycarboxylate solution. The set times of these hydraulic materials is very different, making the retardive effects of some polycarboxylates that are negligible in cement critical to the set of a gypsum wallboard. There are even variations within the realm of gypsum products, with some polycarboxylates being effective for certain gypsum sources and not others. The lack of predictability of polycarboxylate efficacy in gypsum or cement makes it difficult to make a low-water wallboard product given the constraints of the manufacturing process.

Another disadvantage is that polycarboxylates are known to interact with other additives in gypsum products. For example, foam may be added to gypsum board to reduce the weight of the board. However, some polycarboxylates destabilize some foams, causing it to collapse and lose its effectiveness before the board sets. Reaction of the polycarboxylate with foam is not generally predictable from knowledge of the chemical structure of the particular polycarboxylate dispersant being used.

In addition to acting as a dispersant, polycarboxylates are known to retard the set of hydraulic slurries. Retardation in the set of a cement slurry by several minutes would be negligible. However, on a high-speed wallboard line, set retardation of minutes could result in board too soft to cut, too fragile to move to the kiln or even too soft to convey on the production line. Wallboard should be approximately 50% set when it is cut at the knife in order to withstand subsequent handling. When high dosages of polycarboxylates are used to make a flowable slurry at low water to stucco ratios, the set time can be delayed enough to require reduction in the speed of the board making line, severely reducing efficiency. Thus, retardation of the product set times of only minutes has the potential to reduce the productivity of a board line by half, while such a delay in the processing of cementitious materials would not be noticed.

Further, retardation of the set times by the use of polycarboxylate dispersants cannot always be overcome by the addition of set accelerators. The addition of set accelerators to the mixer decreases the set time, but also causes the formation of dihydrate crystals before the slurry leaves the mixer, resulting in premature thickening and reduced flowability of the slurry. Thus, the use of set accelerators to overcome the set retardation can defeat the purpose of adding the polycarboxylate dispersant to increase flowability in the first place.

It would be a great improvement if a gypsum slurry were developed from which wallboard could be made that did not require kiln drying or long drying times. Moreover, the improved slurry would dry quickly without the increase in set times associated with the use of polycarboxylate dispersants.

SUMMARY OF THE INVENTION

This and other needs are improved by the present invention of an improved gypsum slurry and wallboard product, and method of making them. The gypsum slurry includes water, a hydraulic component including at least 50% calcium sulfate hemihydrate based on the weight of the hydraulic component and a specific two-repeating unit polycarboxylate dispersant.

The polycarboxylate dispersant is a co-polymer that includes a first and a second repeating unit, wherein the first repeating unit is an olefinic unsaturated mono-carboxylic acid repeating unit or an ester or salt thereof or an olefinic unsaturated sulphuric acid repeating unit or a salt thereof, and the second repeating unit is of the general formula:

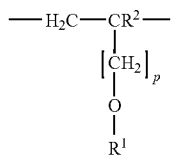

where $R^1$ is represented by

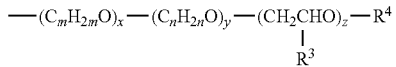

$R^2$ is hydrogen or an aliphatic $C_1$ to $C_5$ hydrocarbon group. $R^3$ is a non-substituted or substituted aryl group, preferably phenyl. $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to the formula:

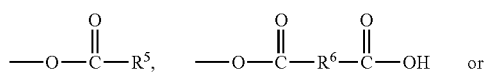

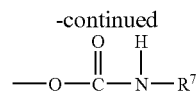

$R^5$ and $R^7$, independently of each other, represent an alkyl, aryl, aralkyl or alkylaryl group and $R^6$ is a divalent alkyl, aryl, aralkyl or alkaryl group. p is 0 to 3, inclusive. m and n are, independently, integers from 2 to 4, inclusive. x and y are, independently, integers from 55 to 350, inclusive. The value of z is from 0 to 200, inclusive.

A second aspect of this invention is a gypsum panel that includes a core of calcium sulfate dihydrate and the dispersant described above.

The gypsum slurry of this invention, the method of making it and the gypsum panel made therefrom result in a cost savings in the fuel burden of the ovens. Less water needs to be driven from the pores of the gypsum products, allowing for a reduction in the oven temperature or the amount of time that the products spend in the oven. Fossil fuels are conserved and the cost savings therefrom can be realized.

The dispersant used in this invention is also less retardive than other polycarboxylate dispersants for the same fluidity. This reduces the need for set accelerators and their associated costs. It also allows the water to stucco ratio to be further reduced in a gypsum board before the green strength of the product is insufficient to continue manufacturing.

DETAILED DESCRIPTION OF THE INVENTION

A gypsum slurry is made from calcium sulfate hemihydrate, water and a specific two-repeating unit dispersant. The dispersant includes a carboxylic acid repeating unit and an alkenyl polyether glycol repeating unit.

The hydraulic material includes any calcium sulfate hemihydrate, also known as stucco or calcined gypsum, preferably in amounts of at least 50%. Preferably, the amount of calcium sulfate hemihydrate is at lest 75%, at least 80% or at least 85% stucco. In many wallboard formulations, the hydraulic material is substantially all calcium sulfate hemihydrate. Any form of calcined gypsum may be used, including but not limited to alpha or beta stucco. Use of calcium sulfate anhydrite, synthetic gypsum or landplaster is also contemplated, although preferably in small amounts of less than 20%. Other hydraulic materials, including cement and fly ash, are optionally included in the slurry.

Although any stucco benefits from this invention, stuccos from different sources include different amounts and types of salt and impurities. The slurry of this invention is less effective when the calcium sulfate hemihydrate has relatively high concentrations of naturally occurring salts. Low-salt stuccos are defined as those having soluble salts of less than 300 parts per million. High salt content stuccos include those having at least 600 parts per million soluble salts. Gypsum deposits from Southard, Okla., Little Narrows, Nova Scotia, Fort Dodge, Iowa, Sweetwater, Tex., Plaster City, Calif. and many other locations meet this preference.

The dispersant used in the slurry includes two repeating units. The first repeating unit is an olefinic unsaturated monocarboxylic acid repeating unit, an ester or salt thereof, or an olefinic unsaturated sulphuric acid repeating unit or a salt thereof. Examples of the first repeating unit are acrylic acid, methacrylic acid, crotonic acid, isocrotonic acid, allyl sulfonic acid and vinyl sulfonic acid. Mono- or divalent salts are suitable in place of the hydrogen of the acid group. The hydrogen can also be replaced by a hydrocarbon group to for the ester. Preferred repeating units include acrylic acid or methacrylic acid.

The second repeating unit satisfies Formula I,

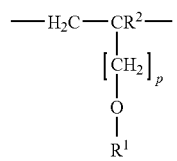

and $R^1$ is derived from an unsaturated (poly)alkylene glycol ether group according to Formula II.

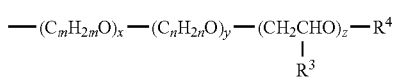

Referring to Formulas I and II, the alkenyl repeating unit optionally includes a $C_1$ to $C_3$ alkyl group between the polymer backbone and the ether linkage. The value of p is an integer from 0-3, inclusive. Preferably, p is either 0 or 1. $R^2$ is either a hydrogen atom or an aliphatic $C_1$ to $C_5$ hydrocarbon group which may be linear, branched, saturated or unsaturated. $R^3$ is a non-substituted or substituted aryl group, preferably phenyl. Examples of preferred repeating units include acrylic acid and methacrylic acid.

The polyether group of Formula II includes multiple $C_2$-$C_4$ alkyl groups, including at least two alkyl groups, connected by oxygen atoms. m and n are, independently, integers from 2 to 4, inclusive, preferably, at least one of m and n is 2. x and y are, independently, integers from 55 to 350, inclusive. The value of z is from 0 to 200, inclusive. $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming at least one of Formula III(a), III(b) and III(c).

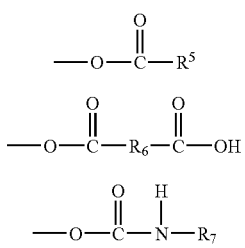

In the above formulas, $R^5$ and $R^7$, independently of each other, represent an alkyl, aryl, aralkyl or alkylaryl group. $R^6$ is a bivalent alkyl, aryl, aralkyl or alkylaryl group.

A particularly useful dispersant of this group, referenced as the "PCE211-Type" dispersant, is designated PCE211 (hereafter "211"). Other polymers in this series known to be useful in wallboard include PCE111. This class of dispersants and how to make them is further described in U.S. Ser. No. 11/152,678, entitled "Polyether-Containing Copolymer", filed Jun. 14, 2005 and herein incorporated by reference.

The molecular weight of the dispersant is preferably from about 20,000 to about 60,000 Daltons. Surprisingly, it has been found that the lower molecular weight dispersants cause less retardation of set time than dispersants having a molecular weight greater than 60,000 Daltons. Generally longer side chain length, which results in an increase in overall molecular weight, provides better dispersibility. However, tests with gypsum indicate that efficacy of the dispersant is reduced at molecular weights above 60,000 Daltons.

Many polymers can be made with the same two repeating units using different distributions of them. The ratio of the acid-containing repeating units to the polyether-containing repeating unit is directly related to the charge density. Preferably, the charge density of the co-polymer is in the range of about 300 to about 3000 µequiv. charges/g co-polymer. It has been found that the most effective dispersant tested for water reduction in this class of dispersants, MELFLUX 2651F, has the highest charge density. MELFLUX dispersants are manufactured by Degussa Construction Polymers, GmbH, Trostberg, Germany, and marketed in the U.S. by Degussa Corporation, Kennesaw, Ga., hereafter "Degussa". (MELFLUX is a registered trademark of Degussa Construction Polymers, GmbH.)

However, it has also been discovered that the increase in charge density further results in an increase in the retardive effect of the dispersant. Dispersants with a low charge density, such as MELFLUX 2500L, retard the set times less than the MELFLUX 2651F dispersant that has a high charge density. Since retardation in set times increases with the increase in efficacy obtained with dispersants of high charge density, making a slurry with low water, good flowability and reasonable set times requires keeping of the charge density in a mid-range. More preferably, the charge density of the co-polymer is in the range of about 600 to about 2000 µequiv. charges/g co-polymer.

This dispersant is particularly well-suited for use with gypsum. While not wishing to be bound by theory, it is believed that the acid repeating units bind to the hemihydrate crystals while the long polyether chains of the second repeating unit on the backbone perform the dispersing function. Balancing of the length of the polyether chains, the total molecular weight and the charge density is an important factors in designing a dispersant for gypsum. Since it is less retardive than other dispersants, it is less disruptive to the manufacturing process of gypsum products. The dispersant is used in any effective amount. To a large extent, the amount of dispersant selected is dependant on the desired fluidity of the slurry. As the amount of water decreases, more dispersant is required to maintain a constant slurry fluidity. Preferably, the dispersant is used in amounts of about 0.01% to about 0.5% based on the dry weight of the stucco. More preferably, the dispersant is used in amounts of about 0.05% to about 0.2% on the same basis. In measuring a liquid dispersant, only the polymer solids are considered in calculating the dosage of the dispersant, and the water from the dispersant is considered when a water/stucco ratio is calculated. This dispersant allows for the design of a high-speed wallboard manufacturing process where the board is at least 50% set within five minutes. Even in the absence of accelerators, at least 50% set is achievable within ten minutes.

Another factor that may be important in the selection of dispersant concentration is the bond with the facing material. Some papers require an additional component to give a satisfactory bond at high dispersant dosages. A different bonding system, such as polyvinyl alcohol, is useful. Another technique that aids in the paper bond is the application of a set accelerator, such as alum, to the paper to speed setting of the slurry onto the facing material.

Polymerization of the repeating units to make the copolymer dispersant is carried out by any method known by an artisan. Preferred polymerization techniques are taught in U.S. Ser. No. 11/152,678, entitled "Polyether-Containing Copolymer", filed Jun. 14, 2005, previously incorporated by reference.

Water is added to the slurry in any amount that makes a flowable slurry. The amount of water to be used varies greatly according to the application with which it is being used, the exact dispersant being used, the properties of the stucco and the additives being used. The water to stucco ratio ("WSR") with wallboard is preferably about 0.1 to about 0.8 based on the dry weight of the stucco. Commonly a WSR of about 0.2 to about 0.6 is preferred. Flooring compositions preferably use a WSR from about 0.17 to about 0.45, preferably from about 0.17 to about 0.34. Moldable or castable products preferably use water in a WSR of from about 0.1 to about 0.3, preferably from about 0.16 to about 0.25. The WSR can be reduced to 0.1 or less in laboratory tests based on the moderate addition of the PCE211-Type dispersants.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency are thus enhanced by the use of water that is as contaminant-free as practical.

The gypsum slurry also optionally includes one or more modifiers that enhance the ability of the polycarboxylate dispersant to fluidize the slurry, thus improving its efficacy. The two-repeating unit dispersant used here is particularly susceptible to the effects of the modifiers. Preferred modifiers include cement, lime, also known as quicklime or calcium oxide, slaked lime, also known as calcium hydroxide, soda ash, also known a sodium carbonate, and other carbonates, silicates, phosphonates and phosphates. Dosage of the modifier is from 0.05% to about 1% depending on the modifier being used and the application with which it is used. When modifiers are used, the efficacy of the dispersant is boosted to achieve a new level of fluidity, or the amount of polycarboxylate dispersant can be decreased to reduce the polycarboxylate expense. Additional information on modifiers and their use is found in U.S. Ser. No. 11/152,317, entitled "Modifiers For Polycarboxylate Dispersants", previously incorporated by reference.

Modifiers have been found to be less effective when added to the slurry after the dispersant contacts the calcined gypsum. Preferably the modifiers and the dispersant are added to the mixer water prior to the addition of the hemihydrate. If both the modifier and the dispersant are in dry form, they can be preblended with each other and added with the stucco. This sequence of addition yields more of a boost in efficacy of the dispersant. A method for adding dispersants and modifiers to a stucco composition is disclosed in more detail in co-pending U.S. Ser. No. 11/152,323, entitled "Method of Making a Gypsum Slurry with Modifiers and Dispersants", previously incorporated by reference.

Additional additives are also added to the slurry as are typical for the particular application to which the gypsum slurry will be put. Set retarders (up to about 2 lb./MSF (9.8 g/m2)) or dry accelerators (up to about 35 lb./MSF (170 g/m2)) are added to modify the rate at which the hydration reactions take place. "CSA" is a set accelerator including 95% calcium sulfate dihydrate co-ground with 5% sugar and heated to 250° F. (121° C.) to caramelize the sugar. CSA is available from USG Corporation, Southard, Okla. plant, and is made according to U.S. Patent No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is frirther described in U.S. Patent No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

In some embodiments of the invention, additives are included in the gypsum slurry to modify one or more properties of the final product. Additives are used in the manner and amounts as are known in the art. Concentrations are reported in amounts per 1000 square feet of finished board panels ("MSF"). Starches are used in amounts from about 3 to about 20 lbs./MSF (14.6 to 97.6 g/m$^2$) to increase the paper bond and strengthen the product. Glass fibers are optionally added to the slurry in amounts of at least 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.4 kg/m$^2$) to improve the water-resistency of the finished gypsum board panel.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. the HYONIC line of soap products from GEO Specialty Chemicals, Ambler, Pa. Foams and a preferred method for preparing foamed gypsum products are disclosed in U.S. Pat. No. 5,683,635, herein incorporated by reference. If foam is added to the product, the polycarboxylate dispersant is optionally divided between the gauge water and the foam water or two different dispersants are used in the gauge water and the foam water prior to its addition to the calcium sulfate hemihydrate. This method is disclosed in co-pending application U.S. Ser. No. 11/152,404, entitled, "Effective Use of Dispersants in Wallboard Containing Foam", previously incorporated by reference.

A trimetaphosphate compound is added to the gypsum slurry in some embodiments to enhance the strength of the product and to improve sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate loses its ability to strengthen the product and the slurry becomes severely retardive.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch or an acid modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

In operation, the gypsum is moved on a conveyor toward a mixer. Prior to entry into the mixer, dry additives, such as dry set accelerators, are added to the powdered gypsum. Some additives are added directly to the mixer via a separate line. Trimetaphosphate was added using this method in the examples described below. Other additives may also be added to the water. This is particularly convenient where the additives are in liquid form. For most additives, there is no criticality regarding placing the additives in the slurry, and they may be added using whatever equipment or method is convenient.

However, when using the dispersant of this invention, it is important to add the dispersant to the water prior to addition of the stucco. Gauge water or make-up water is added at the mixer in amounts needed to meet the target water to stucco ratio when water from other sources has been considered.

Other known additives may be used as needed to modify specific properties of the product. Sugars, such as dextrose, are used to improve the paper bond at the ends of the boards. Wax emulsions or polysiloxanes are used for water resistance. If stiffness is needed, boric acid is commonly added. Fire retardancy can be improved by the addition of vermiculite. These and other known additives are useful in the present slurry and wallboard formulations.

EXAMPLE 1

Tests were conducted to determine the effect of the addition of potassium carbonate on two different dispersants. In each of the following samples, a gypsum slurry was made from 400 grams of stucco from Southard, Okla., 180 grams of water and 0.2% dispersant based on the dry weight of the stucco. The 211 dispersant was made according to Preparation Example 3 of U.S. Ser. No. 11/152,678, filed Jun. 14, 2005, and U.S. Ser. No. 11/451,625, filed Jun. 12, 2006, both entitled "Polyether-Containing Copolymer", previously incorporated by reference. The dispersant type and amount of potassium carbonate are shown in Table I below, together with the results of the patty size and the stiffening rate tests.

TABLE I

| Dispersant | Potassium Carbonate, g | Patty Size, cm | Stiffening Time |
|---|---|---|---|
| 211 | 0.6 | 30.3 | 6:00 |
| 211 | 0.0 | 19.8 | 2:05 |
| MELFLUX 2500L | 0.6 | 26.0 | 10:30 |
| MELFLUX 2500L | 0.0 | 15.5 | 2:35 |

As is seen in the data in Table I above, the two-repeating unit dispersant of this invention, 211, shows reduced stiffening time both with and without the addition of a modifier, potassium carbonate, compared to a prior art dispersant, MELFLUX 2500L. This example also demonstrates the effect of the potassium carbonate modifier on each of these two dispersants. Note that the same concentration 211 dispersant responds much better to the modifier, yielding a larger patty size indicating belier dispersing action, but with a reduction in stiffening time.

EXAMPLE 2

The preferred 211 dispersant was tested with a variety of modifiers to determine the improvement in efficacy. Reagent grade tetra sodium phosphate (TSP), tetra sodium pyrophosphate (TSPP) and sodium carbonate (Soda Ash) were tested. DEQUEST 2006, a penta sodium salt of aminotri (methylene phosphonic acid), available from Solutia Inc., St. Louis, Mo., was also tested.

For all testing samples, the water to stucco ratio was 0.5 and 0.66% by weight wet gypsum accelerator (WGA) based on the dry weight of the stucco was added. The control sample had only 0.5% by weight WGA. The amount of each modifier added is shown in Table II, along with the set time and patty size produced by each sample.

The modifier and dispersant were added to the water, followed by addition of the stucco and WGA. The slurry was stirred until it was consistent.

TABLE II

| Modifier | Control | DEQUEST 2006 | TSP | TSPP | Soda Ash |
|---|---|---|---|---|---|
| Amount | 0 | 0.05% | 0.05% | 0.05% | 0.15% |
| Patty Size | 20 cm | 23.7 cm | 21.5 cm | 25.5 cm | 27.5 cm |
| Stiffening Time | 2:15 | 2:35 | 2:15 | 2:55 | 2:30 |

Even though more soda ash was used to obtain these results, it is considered to be effective because it costs one third the price of the other modifiers. Further, the soda ash increases the patty size by 37% while increasing the set time only 11%. DEQUEST 2006 yields a much smaller patty for about the same set time and TSPP has a smaller patty size but has a higher set time.

EXAMPLE 3

Plant trials were conducted to test the ability of the dispersant to reduce water in wallboard made on a production line. Stucco was delivered to a high shear mixer via a conveyor. Dry additives, such as the starch, were added to the conveyor as the stucco was transported. Gauge water was added to the mixer in an amount necessary to produce the target water to stucco ratio after water in the liquid additives was considered. Trimetaphosphate was added by a separate line directly to the mixer. All components were blended in the mixer until a homogeneous slurry was obtained. The base composition of the slurry is provided in Table III.

TABLE III

| Base Composition, lbs. per 1000 ft² (308 m²) | |
|---|---|
| Stucco | 1714 lbs. (779 kg) |
| Wet Gypsum Accelerator | 45 lbs. (20.5 kg) |
| Soap | 0.42 lbs. (19 g) |

The dispersant was blended to the gauge water prior to its introduction into the mixer at the dosages shown in Table III. The dosage shown is based on the weight of the dry dispersant as a percentage of the dry stucco. The amount of accelerator was adjusted to achieve from 50% to 60% set at the knife. Since hydration is an exothermic reaction, temperature rise was used to estimate the extent of reaction and vary the amount of accelerator accordingly. As more PCE211 was used, the retardation in set resulted in a temperature at the knife indicating less than 50% set, causing the process controller to increase the accelerator dosage. Accelerator amounts for each data point is also shown in Table IV. In this table, the dispersant of this invention, PCE 211 was compared to the base case of 0.14% naphthalene sulfonate and a polycarboxylate dispersant having at least three repeating units.

After all components were blended, the slurry was discharged to a conveyor containing a facing paper. A second sheet of facing paper was placed on top of the slurry and sent through a set of rollers to form a continuous board of four feet (1.2 m) wide and ⅝" (15 mm) thick. The board was then cut into eight foot (2.4 m) lengths at the cutting knife.

TABLE IV

| Dispersant Type | 0.14% NS | 0.21% NS | 0.10% MELFLUX 2500L | 0.10% PCE211 | 0.125% PCE211 | 0.15% PCE211 | 0.20% PCE211 |
|---|---|---|---|---|---|---|---|
| Δ WSR | Base | −0.03 | −0.01 | −0.01 | −0.07 | −0.09 | −0.15 |
| Δ Water, lbs. (kg) | Base | −45 (−21) | −11 (−5) | −21 (−9.5) | −122 (−56) | −161 (−73) | −273 (−124) |
| Δ WGA, lbs, (kg) | Base | 0 | * | 2 (0.9) | 6 (2.7) | 6 (2.7) | 12 (5.5) |

* Data Not Available

Compared to the base line data containing 0.14% naphthalene sulfonate ("NS") (DAXAD dispersant, Dow Chemicals, Midland, Mich.), changing to 0.1% MELFLUX 2500L (available from Degussa) saves about 11 pounds of water per 1000 ft² (16 kg/1000 m²). At the same dosage, PCE211 saves about 21 pounds of water per 1000 ft² (31 kg/1000 m²). Increasing the dosage to 0.20% allowed 273 pounds of water to be saved per 1000 ft² (886 kg/m²) of board length. However, at the highest dispersant dosage, the amount of accelerator had to be increased by 12 pounds (5.5 kg) to meet the requirement of 50% set at the knife. Finished board properties at 0.5 WSR met all specifications, although core and edge hardness results were lower than the control sample. Bond results from certain samples containing PCE211 were poor, but this was due to overdrying before the kiln temperatures were lined out.

While particular embodiments of the gypsum slurry and wallboard have been shown and described, it will be appreciated by those skilled in the art that changes and modifications may be made thereto without departing from the invention in its broader aspects and as set forth in the following claims.

What is claimed is:

1. A gypsum slurry comprising:
   water;
   a hydraulic component comprising at least 50% calcium sulfate hemihydrate by weight based on the dry weight of the hydraulic component; and
   a polycarboxylate dispersant consisting essentially of a first and a second repeating unit, wherein said first repeating unit is an olefinic unsaturated mono-carboxylic acid repeating unit or an ester or salt thereof, or an olefinic unsaturated sulphuric acid repeating unit or a salt thereof, and said second repeating unit is of the general formula (I)

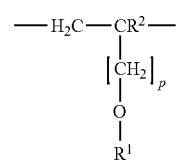

where $R^1$ is represented by formula (II):

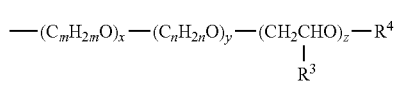

and wherein $R^2$ is hydrogen or an aliphatic $C_1$ to $C_5$ hydrocarbon group, $R^3$ is a non-substituted or substituted aryl group, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to one of the formulae (III):

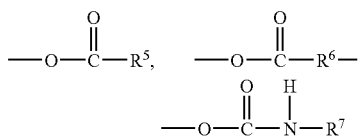

wherein $R^5$ and $R^7$, independently of each other, represent an alkyl, aryl, aralkyl or alkylaryl group and $R^6$ is a divalent alkyl, aryl, aralkyl or alkaryl group, p is 0 to 3, inclusive, m and n are, independently, an integer from 2 to 4, inclusive; x and y are, independently, integers from 55 to 350, inclusive and z is from 0 to 200, inclusive.

2. The gypsum slurry of claim 1 wherein at least one of m and n is 2.

3. The gypsum slurry of claim 1 wherein p is 0 or 1.

4. The gypsum slurry of claim 1 further comprising a modifier chemically configured to increase the efficacy of said polycarboxylate dispersant.

5. The gypsum slurry of claim 4 wherein said modifier is selected from the group consisting of lime, soda ash, carbonates, silicates, phosphates, phosphonates, cement and combinations thereof 6. The gypsum slurry of claim 1 further comprising at least one additive selected from the group consisting of set retarders, set accelerators, foaming agents, trimetaphosphates, biocides, starches, sugars, siloxanes and wax emulsions.

7. The gypsum slurry of claim 6 wherein said set accelerator comprises at least one of wet gypsum accelerator, HRA and CSA.

8. The gypsum slurry of claim 1 wherein said first repeating unit comprises at least one of the group consisting of acrylic acid and methacrylic acid.

9. The gypsum slurry of claim 1 wherein said hydraulic component comprises at least 80% calcium sulfate hemihydrate by weight.

10. The gypsum slurry of claim 1 wherein said calcium sulfate hemihydrate comprises less than 600 ppm of soluble salt.

11. The gypsum slurry of claim 1 wherein the charge density of said dispersant is in the range of about 600 to about 2000 μequiv. charges/g co-polymer.

12. The gypsum slurry of claim 1 wherein said dispersant is present in said slurry in amounts from about 0.01% to about 2% by weight of the dry dispersant calculated as a percentage of the dry gypsum.

13. The gypsum slurry of claim 12 wherein said dispersant is present in amounts from about 0.05% to about 0.3% by weight of the dry dispersant calculated as a percentage of the dry gypsum.

14. A gypsum slurry comprising:
water;
a hydraulic component comprising at least 50% calcium sulfate hemihydrate by weight based on the dry weight of the hydraulic component; and
a polycarboxylate dispersant consisting essentially of a first and a second repeating unit, wherein said first repeating unit is an olefinic unsaturated mono-carboxylic acid repeating unit or an ester or salt thereof, or an olefinic unsaturated sulphuric acid repeating unit or a salt thereof, and said second repeating unit is of the general formula (IV):

$$R^0\text{—}O\text{—}R^1 \qquad\qquad IV$$

Where $R^0$ is represented by formula (V):

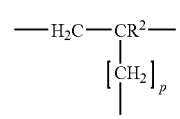

where $R^1$ is represented formula (VI):

$$-(C_mH_{2m}O)_x-(C_nH_{2n}O)_y-R^4 \qquad VI$$

and wherein $R^2$ is hydrogen or an aliphatic $C_1$ to $C_5$ hydrocarbon group, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to one of the formulae (VII):

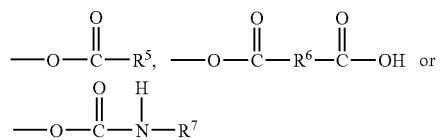

wherein $R^5$ and $R^7$, independently of each other, represent an alkyl, aryl, aralkyl or alkylaryl group and $R^6$ is a divalent alkyl, aryl, aralkyl or alkaryl group, p is 0 to 3, inclusive, m and n are, independently, an integer from 2 to 4, inclusive; x and y are, independently, integers from 55 to 350, inclusive.

15. The gypsum slurry of claim 1 wherein the molecular weight of said polycarboxylate dispersant is from about 20,000 to about 60,000 Daltons.

* * * * *